United States Patent [19]

Nicol et al.

[11] Patent Number: 4,504,860

[45] Date of Patent: Mar. 12, 1985

[54] METHOD AND PROCESS FOR TRANSMITTING AN IMAGE

[75] Inventors: Richard C. Nicol, Ipswich; Brian A. Fenn, Woodbridge; Roger J. Clarke, Burton on the Wold, all of England; King N. Ngan, Singapore, Singapore

[73] Assignee: British Telecommunications, London, England

[21] Appl. No.: 398,608

[22] Filed: Jul. 15, 1982

[30] Foreign Application Priority Data

Jul. 22, 1981 [GB] United Kingdom ............. 8122640

[51] Int. Cl.³ .............................................. H04N 7/12
[52] U.S. Cl. ..................................... 358/133; 358/147; 358/260; 358/287
[58] Field of Search ............. 358/133, 260, 138, 280, 358/283, 147, 287; 364/723, 725, 727; 382/41, 42, 56, 43, 54

[56] References Cited

U.S. PATENT DOCUMENTS

| | | | |
|---|---|---|---|
| 4,179,709 | 12/1979 | Workman | 358/133 |
| 4,189,748 | 2/1980 | Reis | 358/133 |
| 4,224,678 | 9/1980 | Lynch et al. | 358/133 |
| 4,242,733 | 12/1980 | Deal | 358/133 |
| 4,242,734 | 12/1980 | Deal | 358/133 |
| 4,245,330 | 1/1981 | Rebourg | 358/133 |
| 4,261,043 | 4/1981 | Robinson et al. | 358/133 |

Primary Examiner—John C. Martin
Assistant Examiner—Edward L. Coles
Attorney, Agent, or Firm—Mason, Fenwick & Lawrence

[57] ABSTRACT

A method and an apparatus for transmitting an image in which the image is sampled at a first plurality of points. The samples are then subjected to a two-dimensional unitary transform to produce a second plurality of transform coefficients, the second plurality being smaller than the first plurality and being obtained either by selection or truncation of the transform to provide the coefficients containing only the lower frequency components of the image. The transform coefficients are transmitted and on receipt converted by the inverse transform to a second plurality of image samples. Suitable transforms include the Hadamard and the discrete cosine. The image transmission is described as part of a viewdata system.

23 Claims, 11 Drawing Figures

|  | MATRIX | SEQUENCY |
|---|---|---|
| $N=8$ | $\begin{bmatrix} + & + & + & + & + & + & + & + \\ + & - & + & - & + & - & + & - \\ + & + & - & - & + & + & - & - \\ + & - & - & + & + & - & - & + \\ + & + & + & + & - & - & - & - \\ + & - & + & - & - & + & - & + \\ + & + & - & - & - & - & + & + \\ + & - & - & + & - & + & + & - \end{bmatrix}$ | 0<br>7<br>3<br>4<br>1<br>6<br>2<br>5 |

METHOD AND PROCESS FOR TRANSMITTING AN IMAGE

BACKGROUND OF THE INVENTION

This invention relates to a method of transmitting an image and to apparatus for carrying out the method.

It has been proposed to transmit coded alphanumeric and graphical data using the line periods at the start of television frames which do not carry video information so that access to a certain number of pages of information is available to television viewers having suitably modified television receivers. This information system is known by the name Teletext. A similar system has been proposed in which information from a much larger data base is accessible via the public switched telephone network. This system is known by the term Viewdata and a service based on it has been started by the Post Office.

Although the Teletext and Viewdata systems have a graphics capability enabling them to produce simple drawings in a display page, it would clearly be a useful improvement to provide facilities for the display of pictures with the alphanumeric information. However, a difficulty arises in the transmission of pictures in a digital format similar to that used for Teletext and Viewdata information in that to provide a picture of the same resolution as a normal television picture would require between 300 and 500 times as much transmission time as is needed for a page of alphanumeric information, and this is clearly unacceptable. One way in which to reduce both the time necessary to transmit the information and the storage required to display it is to decrease the area of the picture and as a result the number of picture elements in it. For example, a picture ¼ of the height of the screen and ¼ of its width would occupy a sixteenth of the area and would therefore need only 1/16th of the time for its transmission compared with that for a full screen picture. By the use of sophisticated data compression techniques it is possible to reduce the transmission time further so that such a picture could be transmitted in the time required for 8 text pages and the storage needed reduced similarly.

It would be possible to start with a relatively small picture and produce the video signals directly from it, but this would require elaborate optical equipment to ensure that the timing of the resulting video signals is such as to produce the required small image in a page of Teletext or viewdata information. It is clearly preferable to use a full screen image and select the picture elements to be transmitted by a suitable sub-sampling process, but such a process can give rise to aliasing problems as a result of the original image containing frequency components of too high a frequency relative to the sub-sampling frequency. This could be overcome by band limiting the video signal derived from the original picture, but such band limiting has the effect of degrading the image produced subsequently from the samples and it moreover has the disadvantage that it is not effective in a vertical direction where the aliasing problems may still occur.

For achieving the compression of data representing transmitted images it is known to subject the image to a two-dimensional transform such as, for example, a Fourier transform applied in two dimensions, and to transmit data representing the transformed image. At the receiver the received data is subjected to the inverse transform which restores the original image. The quantity of data that must be transmitted to produce an image of given definition is less using transform coding than would be the case if direct transmission of the image had been used. Details of such transforms and their use in transmitting images may be found in, for example, "Digital Image Processing" by W. K. Pratt, published by Wiley Interscience, 1978, and in a paper entitled "Hadamard Transform Image Coding" by W. K. Pratt, J. Kane and H. C. Andrews, published in the Proceedings of the IEEE, Volume 57, No. 1, January 1969, pages 58 to 68.

SUMMARY OF THE INVENTION

It is an object of the present invention to provide an improved method and an apparatus for the transmission of an image.

According to one aspect of the present invention there is provided a method of transmitting an image including producing an original video signal containing a first plurality of samples representing an original image, subjecting the original video signal to at least the lower frequency part of a two-dimensional unitary transformation matched in terms of size of sample array to the first plurality of samples and, if necessary, selecting the coefficients of the transformed video signals, so that a set consisting of a second plurality of transform coefficients containing only the lower frequency components of the original video signal is produced, transmitting the set of transform coefficients, subjecting the transmitted set of coefficients to a second transformation, having the inverse effect to the two-dimensional unitary transformation and matched in terms of size of sample array to the number of coefficients in the set, to produce an output video signal having a second plurality of samples, the second plurality being smaller than the first plurality, and regenerating an image having fewer picture elements than the original image from the output video signal.

According to a second aspect of the present invention there is provided apparatus for transmitting an image including source means for producing an original video signal containing a first plurality of samples and representing an original image, first processing means responsive to the original video signal to produce a set of output signals representing a set of transform coefficients fewer in number than the first plurality and containing only the lower frequency components of the original video signal, the coefficients being produced by a two-dimensional unitary transformation matched in terms of size of sample array to the first plurality of samples, a channel for transmitting the set of output signals from the first processing means, second processing means responsive to the transmitted output signals to subject the set of transform coefficients to a second transformation having the inverse effect to the two-dimensional unitary transformation and matched in terms of size of sample array to the number of coefficients in the set, to produce an output video signal having a second plurality of samples, the second plurality being smaller than the first plurality, and a display device for producing an image having fewer picture elements than the original image from the output video signal.

Since a Hadamard transformation is one example of a suitable two-dimensional unitary transformation for use in the invention, the term "frequency" as employed in the statements of invention above and in the following description should be taken to include "sequency" as defined later.

The particular feature of the invention which produces the effect of low pass filtering of the original image in the two dimensions of the unitary transformation lies in the production or selection of only those coefficients of the transformation which correspond to the lower frequency components of the original video signal and the use of an inverse transformation matched in terms of size of sample array to the lower number of coefficients. Preferably the two-dimensional unitary transformation is separable, that is to say it can be divided into orthogonal one-dimensional transformations applied to the rows and then to the columns, or vice versa, of the image array. Suitable transformations are described in Chapter 10 of the book "Digital Image Processing" referred to above, and include Fourier, sine, cosine, Hadamard and Haar transforms. Of these the cosine and Hadamard are best suited to the present invention and result in the energy of the transformed image being concentrated in the upper left-hand corner of the transform array, that is the part containing the lower frequency components of the original video signal.

Whilst it would be possible to apply the transform to the whole of the original image, say 256×256 pixels, the number of terms involved would mean that the transformation and its inverse would take a considerable time to perform and would need a large amount of data storage. This time could be shortened and the data storage required reduced by dividing the image into blocks, for example, 16 blocks each of 64×64 pixels or 256 blocks each of 16×16 pixels, and applying the transformations to the blocks separately. Such blockwise transformation can result in the block structure being visible in the reproduced image in certain instances, for example where there is a large change in mean brightness between blocks.

Suppose that a square original image 256×256 pixels were required to be reproduced as an image one-quarter the size in each direction, that is to say 64×64 pixels. The effect of the transformation on a block 64×64 pixels and the subsequent selection of coefficients would be to give an array of 16×16 transform coefficients; the transformation itself would normally produce 64×64 transform coefficients if the transformation was such as to result in no loss of information, but it could be truncated so that the coefficients, other than the 16×16 wanted ones containing the lower frequency components are not produced. After transmission the 16×16 array of coefficients is subjected to an inverse transformation matched to the 16×16 array and therefore producing a 16×16 array of pixels similar to the original block of 64×64 pixels but with a 4:1 reduction in the resolution of detail. Most conveniently the samples contained in the original video signal may be digital having, for example, 8 bits per sample. In such a case the processing necessary to perform the transformations could be carried out digitally using, for example, a suitably programmed microprocessor. For digital processing the Hadamard transform is advantageous since the basis functions of the transform are rectangular waves consisting of $+1$'s and $-1$'s. A disadvantage of a Hadamard transform is that it is difficult to use for array sizes other than powers of 2 which means that the size reductions possible are also limited to powers of 2. A discrete cosine transform does not suffer from this limitation, although it does introduce distortions in the final image around the vertical and horizontal edges, whereas such distortions are less marked with the Hadamard transform.

Since there is a difference between the size of the original array subjected to transformation and the transmitted array which is subjected to the inverse transform, it is necessary to normalise the coefficients to retain the energy invariance property of the transformation. This normalisation may be built into the basis functions of the transformations.

Because the transformation of the samples of the original video signal is concerned with processing the whole of a picture containing, say, 256×256 pixels and would require the computing power of a large fast computer to be performed on-line for transmission as part of a viewdata signal, it is preferable to perform the transform calculations off-line and store the resulting transform coefficients, or just the selected coefficients, ready for transmission when required. A relatively slow microcomputer would be all that was necessary to produce the transform coefficients off-line. Storing just the selected coefficients ready for transmission has the advantage of requiring the minimum quantity of data storage capacity in a computer data-base for storing a picture of a given size.

The recording of the transform coefficients may be arranged so that they are transmitted in such a way that the coefficients containing the lowest frequencies are transmitted first and the higher frequencies are transmitted later. The result of such transmission would be that the image reproduced initially from the transmitted coefficients would be complete but of very low resolution, the resolution improving as further coefficients were transmitted and the additional information incorporated in the reproduced image. Alternatively, the coefficients could be stored on a block-by-block basis and the image built up one block at a time.

Although reference has been made to the processing of an original image containing 256×256 pixels, the original image could have a different format, for example, 64×256 or 256×64 pixels. Such an image could be divided into 64×64 pixel blocks in the same way and the transformed coefficients relating to these blocks transmitted. In a viewdata system capable of accommodating different sizes and shapes of picture, the hidden information associated with the first frame of the page would specify how many blocks were contained in the picture or how many additional frames of data were required to provide the picture information; for a description of the use of hidden information see British Patent Specification No. 1 581 136. When the first frame of the page has been received by the viewdata terminal and displayed, the customer will be invited to press the "hash" (#) key to obtain the picture. The extra frames will then be transmitted when the hash key is pressed and the image blocks for display generated and stored at the receiver. The first frame of the page would include "start insert" codes in each line of the picture insert and the picture data itself contains "end of the line" codes so that the picture is precisely located. In another example the picture information is transmitted automatically without it being necessary to press any key, in which case the later references to pressing the "hash" key and the consequences of such pressing may be ignored.

As explained above, the Hadamard transform can be used only for orders of $2^n$, n integral, and it is preferable to use this transform because it is much easier to implement by digital computing techniques than is the discrete cosine transform, for example. The system may be arranged so that the Hadamard transform is used if the image size permits and the discrete cosine transform if other sizes are required. The processing means may be such as to handle the different transforms selectively on receipt of suitable control signals transmitted with the image information.

BRIEF DESCRIPTION OF THE DRAWING

In order that the invention may be fully understood and readily carried into effect it will now be described with reference to accompanying drawings, of which.

DESCRIPTION OF THE PREFERRED EMBODIMENT

It is not proposed to discuss the theory of the transforms used beyond noting that they are similar to Fourier transforms in the production of linear functions of the samples in the row or column to provide values related to the amplitudes of different frequency components in the video signal represented by the samples. The reader is referred to the following publications for information relating to the theoretical basis of the transforms.

1. Digital Image Processing, by W. K. Pratt published by Wiley Interscience, 1978, Chapter 10.
2. Hadamard Transform Image Coding, by W. K. Pratt, J. Kane & H. C. Andrews, in Proc. IEEE, Vol. 67, No. 1, January 1969, pages 58-68.
3. A Fast Computational Algorithm for the Discrete Cosine Transform, by W-H Chen, C. H. Smith & S. C. Fralick, in IEEE Transactions on Communications, Vol. COM-25, No. 9, September 1977, pages 1004-1009.

Figure 1:
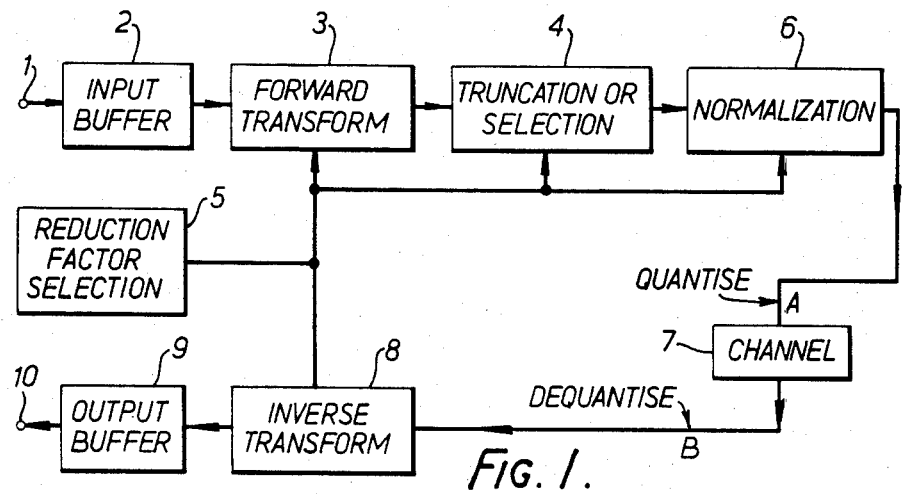
FIG. 1 is a functional diagram of one example of the apparatus according to the invention.

Referring now to FIG. 1, input information representing a rectangular block of an image to be transmitted is applied via terminal 1 to an input buffer store 2. In the block, which consists of $64 \times 64$ picture elements, each picture element is represented as an 8-bit byte. On this array of picture elements the forward transform is applied to produce a corresponding array of $64 \times 64$ transform coefficients. During the processing to generate these coefficients they are allocated 16 bits or 2 bytes each. The $64 \times 64$ array of coefficients is then subjected to truncation or selection as indicated by the block 4 which takes into consideration the size of the reduction factor required in producing the final image. Suppose that this reduction factor is 4:1, then the effect of the truncation or selection is to discard the all but a $16 \times 16$ array of coefficients. The selected coefficients are the ones containing the lower frequency components of the original image and are also the ones likely to contain the greatest amount of energy in the transformed image. The selected transform coefficients are then normalised (divided by the reduction factor introduced by the selection) as indicated by block 6 to compensate for the fact that the transform coefficients were constructed on the basis of a $64 \times 64$ picture element array but that only a $16 \times 16$ array of coefficients remains. In a viewdata system the array of coefficients would be stored in a computer data base, but this stage is not shown in FIG. 1. The normalised, selected transform coefficients are then quantised at A. The quantised array of coefficients is then coded, transmitted via channel 7 and decoded at B for application to means 8 for performing the inverse transform. The quantising of transmitted information is chosen to enable the retention through the transmission path of the greatest amount of the image information, bearing in mind that the values of the coefficients will, in general, vary from a maximum corresponding to the lowest image frequencies to a minimum corresponding to the highest remaining image frequencies. The inverse transform formed by the block 8 is matched to the $16 \times 16$ array of transform coefficients applied to it and generates a $16 \times 16$ array of picture elements which are stored in output buffer store 9 for transmission to an output terminal 10.

The effect of the selection of transform coefficients by the block 4 is to apply a low pass filtering to the image in such a way as to avoid possible aliasing resulting from the sub-sampling of the image involved in the reduction of the $64 \times 64$ picture element array to a $16 \times 16$ picture element array. The reduction factor can have any value which results in suitable integral values for the transform matrices. In the case of the Hadamard transform the reduction factor must be a power of 2. On the other hand, if the discrete cosine transform is used, then a reduction factor of 3 could be achieved reducing a $60 \times 60$ picture element array to a $20 \times 20$ array, since the order of the discrete cosine transform need be only a multiple of 2.

The forward and inverse transforms are both two-dimensional unitary transforms which are preferably separable so that they can be applied as one-dimensional transforms to the rows and columns of the arrays. It would be possible to use a Fourier transform, but this suffers from the disadvantage of requiring separate sine and cosine components so that two arrays of transform coefficients would be required for each image. Since the most convenient way of performing the transforms is by digital computation the Hadamard transform has the advantage of requiring multiplication by $+1$ and $-1$ only in addition to the summation processes (i.e. only addition and subtraction). The smallest Hadamard transform matrix is $2 \times 2$ and is $$\frac{1}{\sqrt{2}} \begin{bmatrix} 1 & 1 \\ 1 & -1 \end{bmatrix}$$

From this matrix can be built up any Hadamard matrix, since the Hadamard matrix of size $2^n$ is equal to $$\frac{1}{\sqrt{2}}\begin{bmatrix} H_{n-1} & H_{n-1} \\ H_{n-1} & -H_{n-1} \end{bmatrix}$$

where $H_{n-1}$ is the Hadamard matrix of size $2^{n-1}$. As the Fourier transform is concerned with frequencies, it has been suggested that the number of sign changes in a row of a Hadamard matrix be termed the "sequency" of that row; the same term can be applied to the columns of the matrix as well.

Another advantage of the Hadamard transform is that it is its own inverse.

Figure 9:
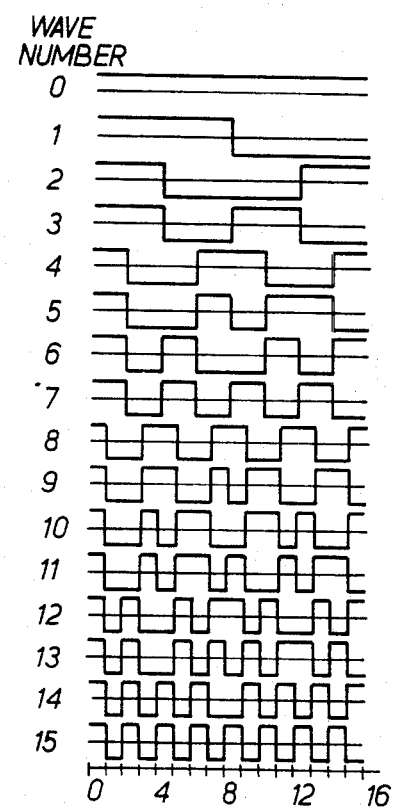
FIG. 9 shows the basis functions of a Hadamard transform.
Figures 10, 11:
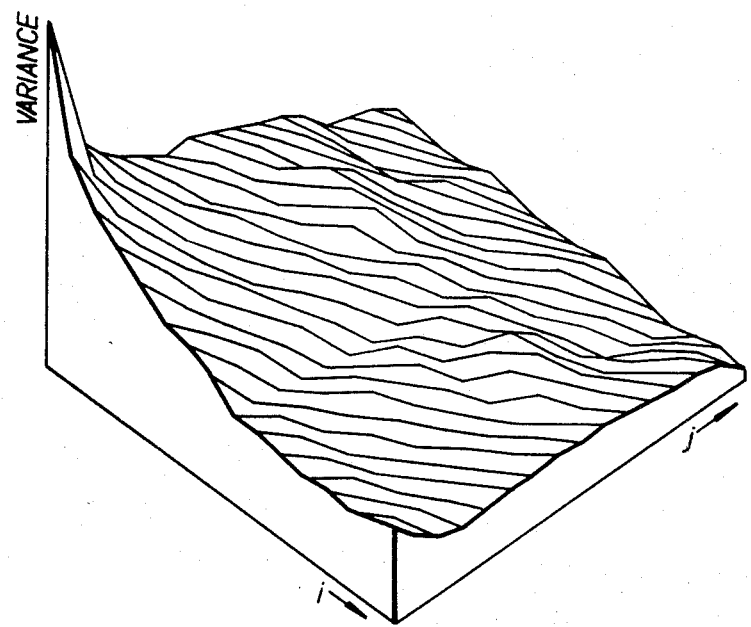
FIG. 10 shows a Hadamard transform matrix of order 8.
FIG. 11 is a representation of a plot of the logarithm of the energy (variance) distribution in a transformed image.

In order to visualise the nature of the transform, FIG. 9 shows the basis functions for the Hadamard transform of order 16, and FIG. 10 shows the transform matrix for a transform of order 8 with the sequency of the rows illustrated beside them.

Another transform which could be used which does not suffer from the disadvantage of the Fourier transform or the size limitations of the Hadamard transform is the discrete cosine transform, and the discrete cosine transform of the function $f(j)$, $j=0, 1, \ldots, n-1$ is defined as $$F(k) = \frac{2c(k)}{N} \sum_{j=0}^{N-1} f(j) \cos \frac{(2j+1)k\pi}{2N} \qquad (1)$$

$$k = 0, 1, \ldots, N-1$$

and the inverse transform is $$f(j) = \sum_{k=0}^{N-1} c(k) F(k) \cos \frac{(2j+1)k\pi}{2N} \qquad (2)$$

$$j = 0, 1, \ldots, N-1$$

where $$c(k) = \frac{1}{\sqrt{2}} \text{ for } k = 0$$

$$= 1 \text{ for } k = 1, 2, \ldots, N-1$$

Figure 8:
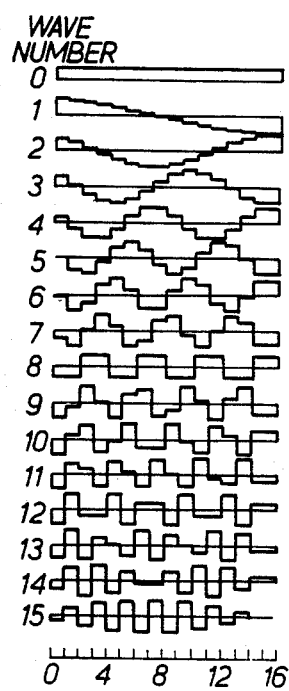
FIG. 8 shows the basis functions of a discrete cosine transform.

To simplify the visualisation of this transform the basis functions for one of order 16 are shown in FIG. 8.

Figure 2:
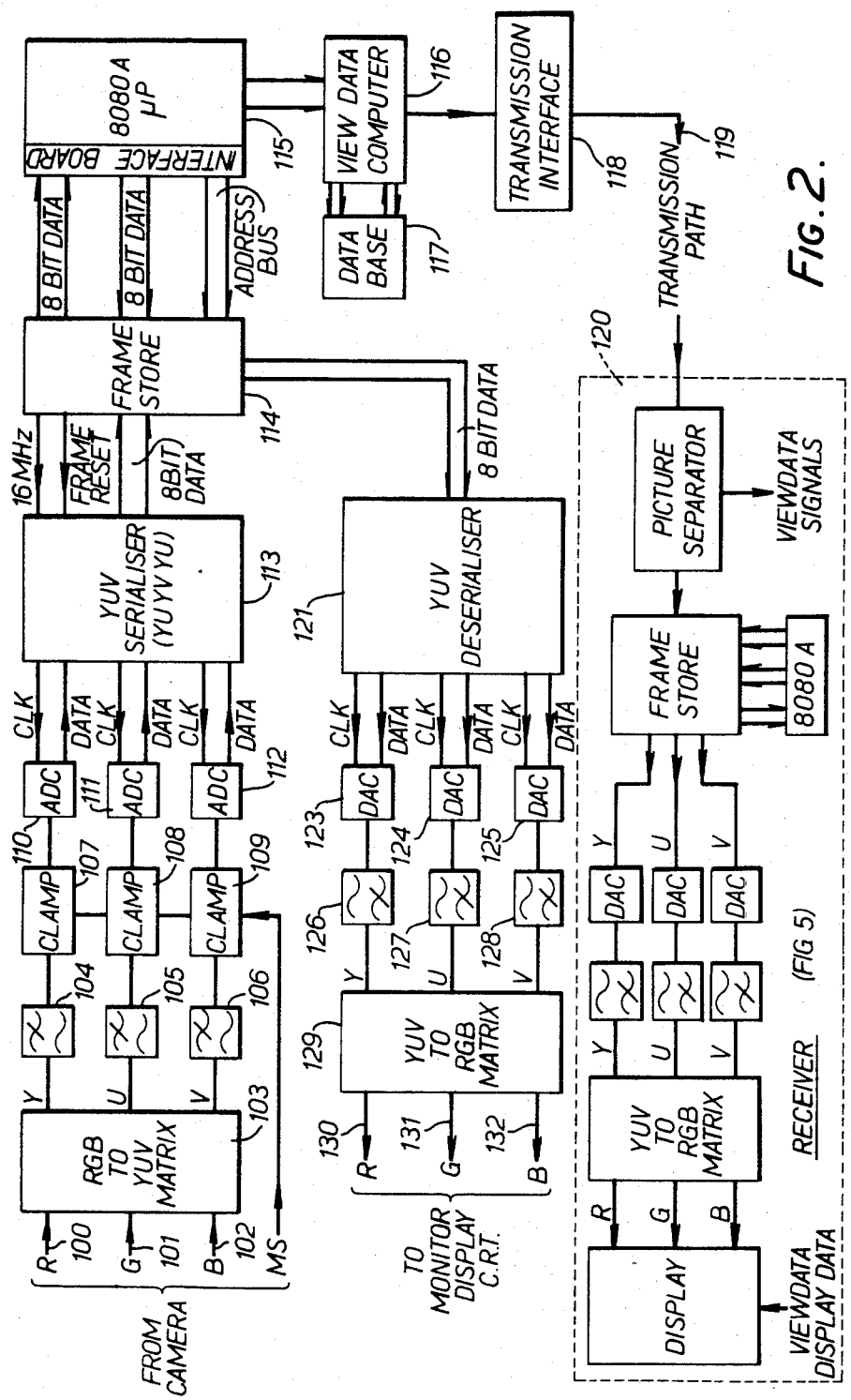
FIG. 2 is a block diagram of circuitry suitable for constructing the apparatus of FIG. 1.

The operations set out in FIG. 1 may be implemented by the apparatus shown in FIG. 2. In FIG. 2 red, green and blue video signals from a television camera are applied via conductors 100, 101 and 102 to an RGB to YUV matrix circuit 103 which may be of conventional construction, designs for which may be found in many textbooks on colour television. The signals R, G, B, Y, U and V have the conventional meanings. The YUV signals output from the circuit 103 are transmitted via low pass filters 104, 105 and 106 and clamps 107, 108 and 109 to analogue to digital converters 110, 111 and 112 respectively. The digital outputs of the converters 110, 111 and 112 are applied via a YUV serialiser 113 which produces output signals in the sequence YU, YV, YU . . . , as 8-bit bytes of data which are stored in a frame store 114. The serialising of the data in this way is performed because the Y signal which carries the brightness information of the image has roughly twice the bandwidth of the U and V colour difference signals and therefore requires twice as many samples per unit time to convey the picture information. The same restricted bandwidth is also used in the vertical direction for the U and V signals by employing the same U and V signal samples for pairs of adjacent lines. In the frame store 114 three separate arrays of picture elements are stored, one for the Y signals, one for the U signals and one for the V signals. These arrays typically have $64 \times 64$ elements for the Y signals and $32 \times 32$ elements for the U and V signals.

Figure 5:
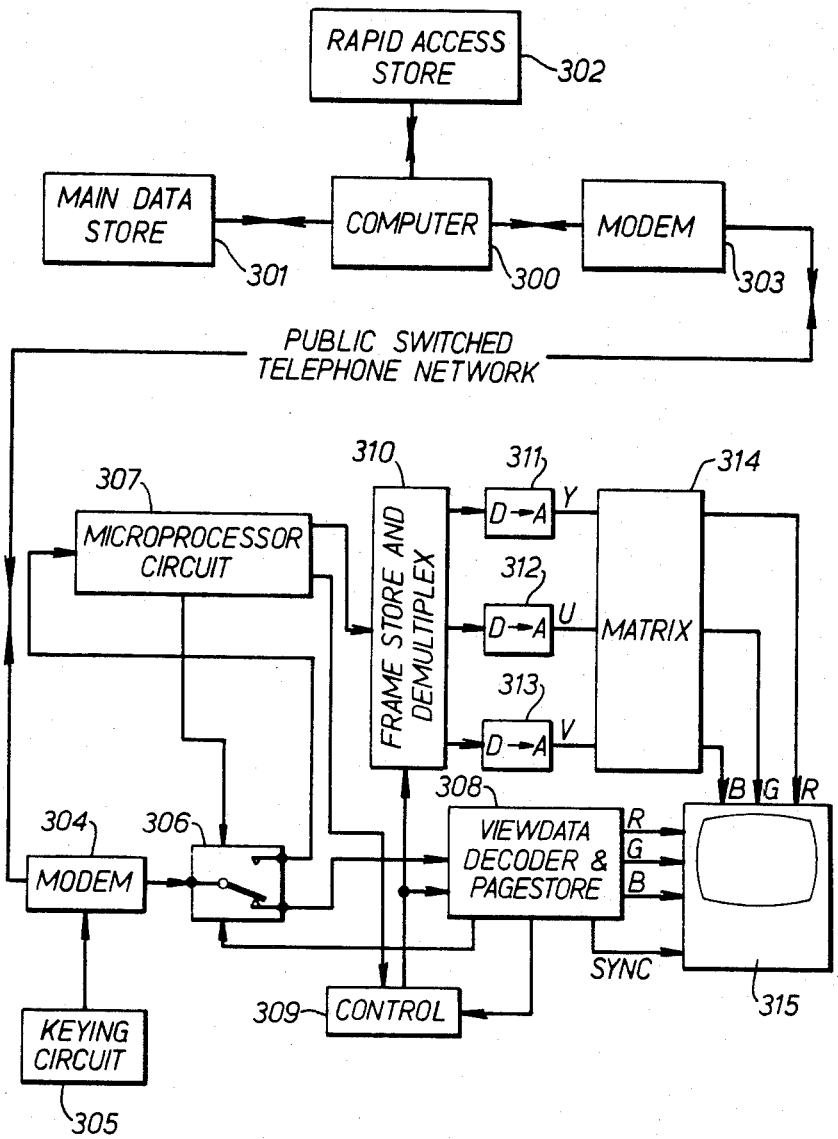
FIG. 5 is a block diagram of a viewdata system showing one example of how the apparatus of FIGS. 1 and 2 may be incorporated in it.

The microprocessor circuit 115 is connected to the frame store 114 and is programmed to perform the transform on the three arrays of picture elements in the store 114 to produce three arrays of the same sizes as the picture element arrays but of transform coefficients resulting from a one-dimensional application of the transform, for example on the rows of the arrays. The microprocessor circuit 115 then performs the transform a second time, this time on the columns of the arrays of the transform coefficients to complete the two-dimensional transform and produce three further arrays of transform coefficients in the frame 114. The final arrays of transform coefficients are then transmitted to a viewdata computer 116 where they are combined with alphanumeric data in a data base 117 in which are recorded the data accessible to the viewdata customers. The selection of the smaller arrays, e.g. of $16 \times 16$ coefficients for the Y signal and $8 \times 8$ coefficients for each of the U and V signals is performed by the microprocessor circuit 115 and may even be combined with the transform program so that coefficients which are not to be used are not calculated. A transmission interface 118 forming part of a viewdata system receives the frames of information from the data base 117 which are required by a particular viewdata customer and transmits them via a transmission path 119 to a receiver 120 which may be as shown in FIG. 5. The viewdata receiver 120 will also include a keyboard and pulse generating circuits enabling a customer to send numerical messages for selecting desired pages in the viewdata computer 116 and the computer 116 will have means for receiving these messages and acting on them. None of these details is shown in FIG. 2 since they are not pertinent to the invention. In the receiver the received picture data is stored in a frame store like the store 114, and the picture data are processed in the same way as for the monitor display which will be described later, except that a YUV deserialiser is not used, the frame store in the receiver being connected to produce the Y, U and V signals on separate channels. The receiver includes a second microprocessor circuit which is connected to the frame store and performs the inverse transform on the three arrays of received transform coefficients. As with the forward transform the inverse transform is applied twice, once along the columns and once along the rows, to produce three arrays of picture elements respectively representing the Y, U and V signals of the lower definition image similar to that originally stored in the frame store 114.

To produce the monitor display the 8-bit bytes of data are read from the store 114 and applied to a YUV deserialiser 121. The Y, U and V signals now in parallel channels are converted back to analogue form by converters 123, 124 and 125 respectively and the resulting analogue signals after filtering in filters 126, 127 and 128 are applied to a conventional YUV to RGB matrix circuit 129 to produce on conductors 130, 131 and 132 the red, green and blue colour component signals for generating a monitor display of the lower definition picture.

Figure 3:
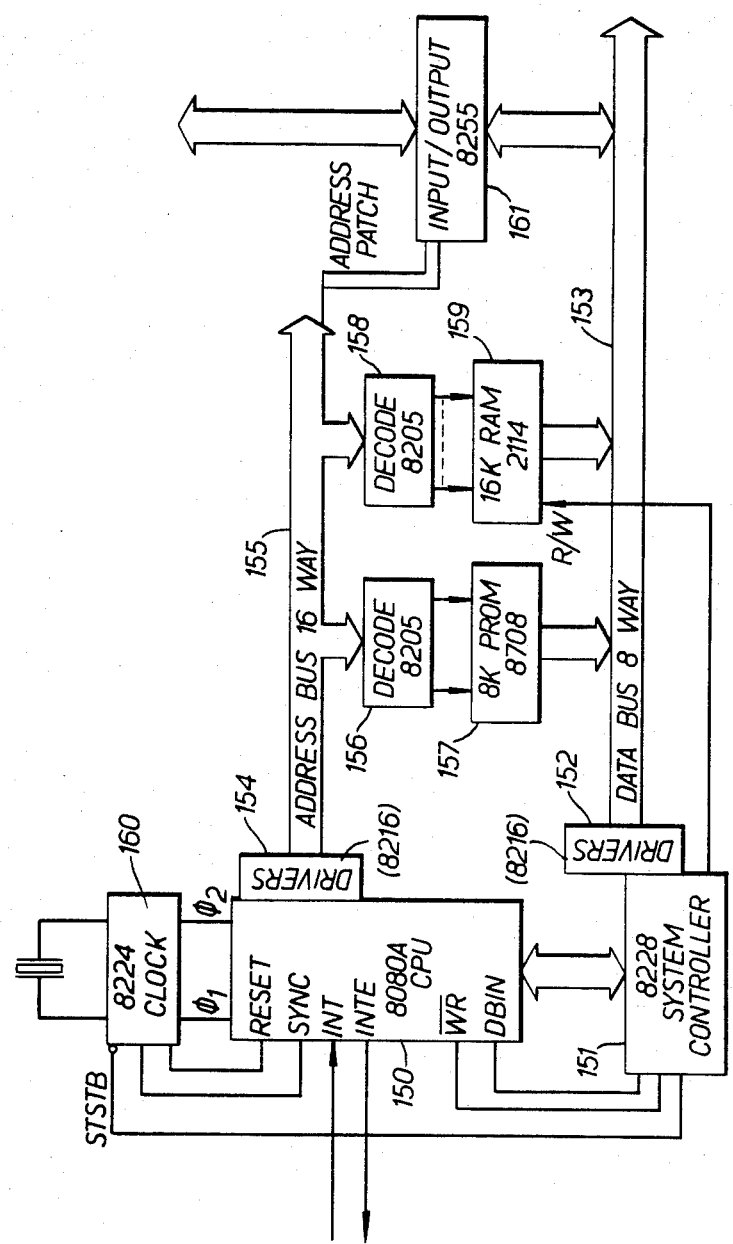
FIG. 3 is a diagram of the microprocessor circuits of FIG. 2.

FIG. 3 is a diagram of the microprocessor circuits shown in FIG. 2 and includes an 8080A CPU 150 connected to an 8228 system controller 151 and via this and driver circuits 152 of type 8216 to an 8-way data bus 153. In addition the CPU 150 is connected via further drivers 154 of type 8216 to a 16-way address bus 155. The address bus 155 is connected to decoders 156 of type 8205 from which address signals for unit 157 containing 8K bytes of PROM are generated. The PROM circuits of type 8708 are connected to feed their data to the data bus 153. A further decoder 158 is connected to the address bus 155 and to 16K bytes of RAM 159 of type 2114. Data input and output to the RAM 159 is provided via the data bus 153. Read-Write signals for the RAM 159 are provided by the system controller 151. The data bus 153 is also connected to an input-output device 161. The 8080A CPU 150 requires an external clock which is provided by unit 160 of type 8224. A particular combination of the conductors of the address bus 155 is connected to the input/output circuit 161 of type 8255, which is used to address the input/output circuit. The circuit 161 is connected to the frame stores in FIG. 2; the address bus 155 is connected to address decoders associated with the frame stores and the data bus 153 is connected to the storage elements themselves. All of the circuitry shown in FIG. 3 is obtainable from the Intel Corporation and details of the power supplies and signal timing are published in the data books published by the Intel Corporation for the particular circuit types. The details of the program for the microprocessor are not given since these are quite straightforward involving the selection of the array elements in turn from the frame store, the performance of multiplications and additions required by the transform and the transfer back to the frame store of the corresponding result. The papers "Hadamard Transform Image Coding" and "A Fast Computational Algorithm for the Discrete Cosine Transform" referred to above disclose computational techniques for implementing the transforms which can readily be converted to programs for the microprocessor.

Figure 4:
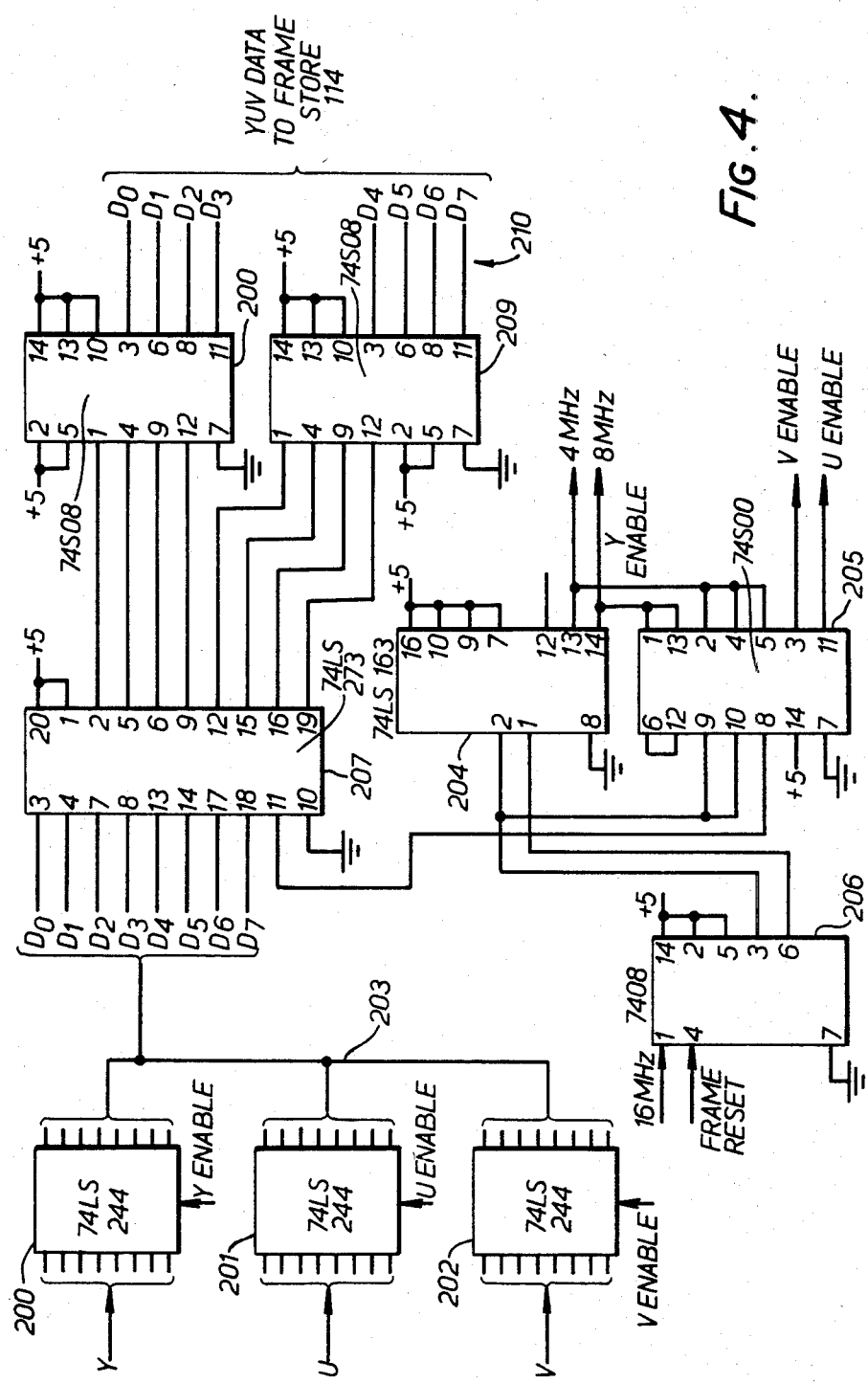
FIG. 4 shows the circuit of the YUV serialiser of FIG. 2.

The YUV serialiser 113 and the YUV deserialiser 121 of FIG. 2 may be basically of similar construction, and the circuit of the serialiser 113 is shown in FIG. 4. The digital outputs from the analogue to digital converters 110 to 112 (FIG. 2) in 8-bit parallel from are applied respectively to tri-state buffer stores 200, 201 and 202 from which the signals are applied in sequence to a common 8-bit bus 203 in response to Y enable, U enable and V enable signals. Y enable, U enable and V enable signals are generated by a 4-bit counter 204 and a gating circuit 205 as shown in FIG. 4. The counter 204 is driven by a 16 MHz clock signal obtained from the frame store 114 via gates in an integrated circuit 206. The bus 203 drives buffer stores 207 the output of which are connected to two blocks of four gates 208 and 209 having eight parallel output conductors 210 connected as the data input to the frame store 114 in FIG. 2. The operation of the tri-state buffer stores 200, 201 and 202 by the Y enable, U enable and V enable signals is such that the Y, U and V data bytes appear in the sequence YU, YV, YU, YV, etc., on the output data conductors 210.

Although the image transmission apparatus and method described above can be used generally, it is particularly suited to the transmission of pictures in a viewdata system and the modifications required to a viewdata system to provide the picture transmission will now be described with reference to FIGS. 5, 6 and 7. It is not proposed to describe in detail construction and operation of the viewdata system itself, since a practical system is now being operated by the British Post Office and suitably modified television receivers and apparatus for adding to existing television receivers are currently available on the market.

Referring now to FIG. 5 which shows in block diagram form a modified viewdata system, the viewdata transmitter consists of a suitably programmed computer 300 having a main data store 301 and a rapid access store 302. The computer 300 has as an input/output port a modem 303 by which the computer 300 is connected to the public switched telephone network.

The receiver for the viewdata system is connected to the public switched telephone network through a modem 304 to which is connected a keying circuit 305 enabling the customer to transmit messages to the computer 300. The output data from the modem 304 is applied to a switching circuit 306 controlled by signals from a microprocessor circuit 307 and a viewdata decoder and page store 308. The switching circuit 306 has two outputs, one of which is applied as an input to the microprocessor circuit 307 and the other of which is applied as an input to the viewdata decoder and page store 308. A control circuit 309 receives inputs from both the microprocessor circuit 307 and the viewdata decoder and page store 308. The switching circuit 306 has two outputs, one of which is applied as an input to the microprocessor circuit 307 and the other of which is applied as an input to the viewdata decoder and page store 308. A control circuit 309 receives inputs from both the microprocessor circuit 307 and the viedata decoder and page store 308 and applies control signals to a frame store and demultiplexer 310 which is connected to receive output signals from the microprocessor circuit 307. The frame store and demultiplex circuit 310 has three digital outputs which are applied respectively to three digital to analogue converters 311, 312 and 313 respectively for producing analogue output signals representing the Y, U and V components of a colour television signal. These Y, U and V signals are converted to red, green and blue signals by a matrixing circuit 304 and are applied to a colour television receiver 315 for producing a display. The viewdata decoder and page store 308 also produces red, green and blue video signals which are applied to the receiver 315 and it also provides a synchronising signal for the receiver 315.

In the normal viewdata operation of the circuit shown in FIG. 5 in which digitally coded alphanumeric information is received from the computer 300 and is displayed as pages of alphanumeric and/or graphical data on the screen of the receiver 315, the switching circuit 306 is in the lower position shown in FIG. 5 in which the output of the modem 304 is applied directly to the viewdata decoder and page store 308 which operates in the normal manner for viewdata signals to produce the required video signals generating a display on the receiver 315. When, however, a viewdata page containing picture information is selected by the customer, the alphanumeric data will include instructions to the customer to depress the hash key on his keyboard if he wishes to receive the picture. The depression of this key results in the viewdata decoder and page store 308 switching over the circuit 306 so that the signals received from the computer 300 are applied to the microprocessor 307. The microprocessor circuit 307 is basically of the construction shown in FIG. 3. When the computer 300 receives the signal indicating that the hash key was pressed, it causes the transmission of the frames of information representing the picture to be included in the viewdata page. The first frame of this viewdata page includes "hidden" data amongst which is recorded the number of additional frames needed to store the picture. This hidden data was transmitted to the rapid access store 302 of the computer 300 with the remainder of the first frame when selected from the main store 307 and causes the computer 300 to select the appropriate number of following frames and transmit the data to the receiver. This data is stored in the frame store 310 whch carries out the inverse transformation described above and produces the Y, U and V signals representing the elements of the picture to be produced.

Figure 6:
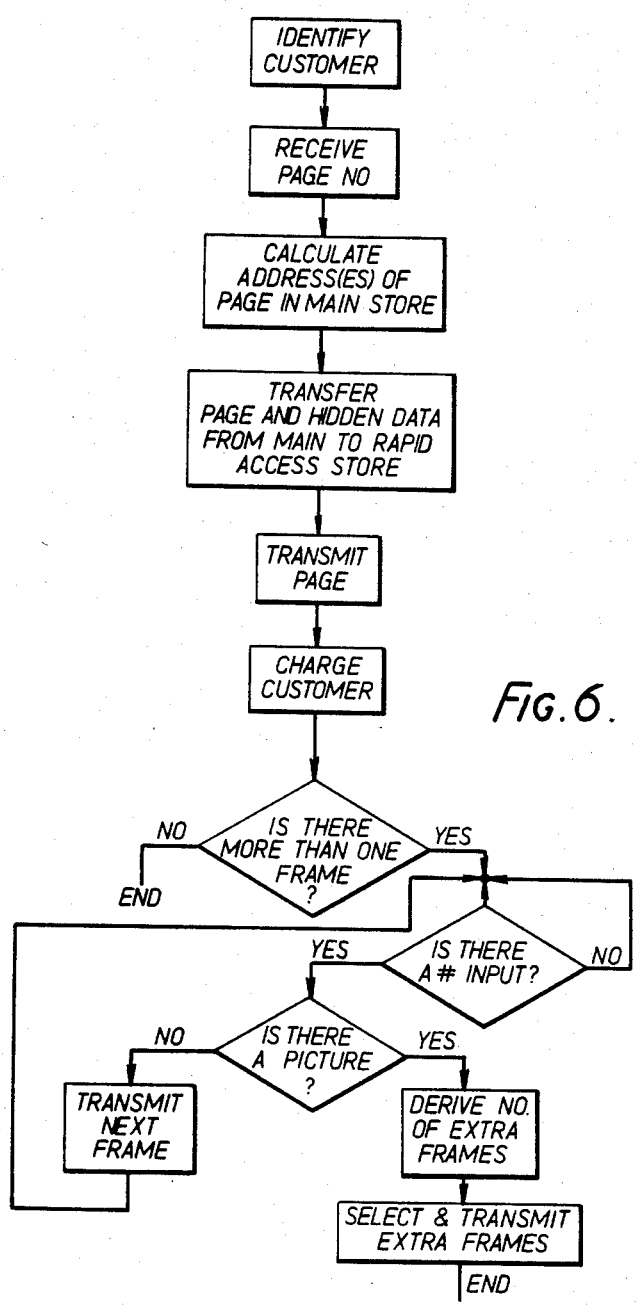
FIG. 6 is a flow diagram of the selection of picture information in a viewdata system.

FIG. 6 shows a flow diagram of the selection operations performed by the computer 300 in selecting the additional frames containing picture information for transmission to a customer. From a study of FIG. 6 it will be apparent that the operation of the computer 300 will follow that outlined above. The modifications to the flow diagram to represent a system in which the picture data are produced without the need to press the "hash" key will also be apparent.

Figure 7:
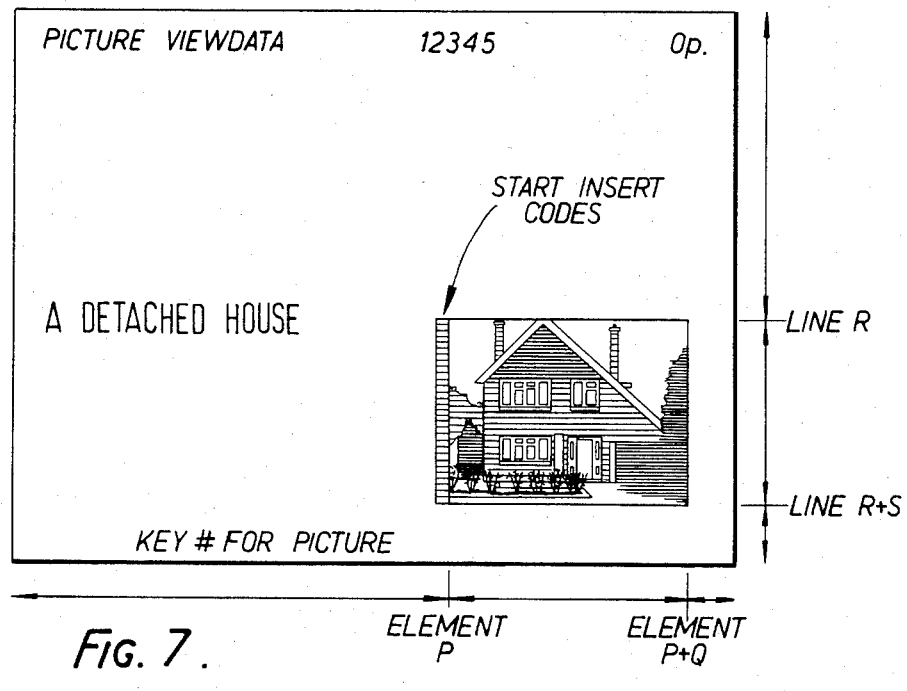
FIG. 7 is a typical display of a viewdata page including a picture occupying 1/9th of the area of the page.

In order to explain how the picture information is combined with the alphanumeric and graphic information to produce a common display of a page including the picture on the screen of the receiver 315, attention is directed to FIG. 7 which shows an example of a page having a picture occupying 1/9th of the area, being ⅓rd of the height and ⅓rd of the width of the frame. The timing is controlled by the line scan of the screen, and in normal viewdata operation the video signals are generated by a character generator in response to the coded information which is selected synchronously with the description of the raster on the screen. At the left-hand side of the picture each line section is preceded by a "start insert" code which does not cause any visible information to be displayed, but causes the lines of video information of the picture to be selected from the frame store 310 and the appropriate video signals applied to the receiver 315; this is part of the function of the control unit 309. Of course, if there is no picture information available, for example, because the particular receiver does not contain the necessary circuitry, then there will be no display in the screen and instead of a picture there will simply be a blank area. At the ends of the lines of the picture the control circuits encounter "end of line" codes and returns generation of video signals to the viewdata decoder and page store 308. This allows the picture to unfold line by line as the data is received. This multiplexing of alphanumeric/graphical data with the picture data continues until all of the picture data have been read when the control unit 309 notes that further picture information is not available in that display raster and it then awaits the occurrence of the "start insert" codes in the next frame. Every time a new text page is called a "form-feed" character is used to clear the text from the screen. This same character is also used to clear the picture store when a text page associated with a picture insert is requested.

Although the picture insert shown in FIG. 7 is of the same shape as the television frame, it is not necessary for it to be so; it could be tall and thin or low and wide if the particular picture to be displayed were such as to require it, for example, of a person standing up or of a ship. Such pictures would be divided into square blocks as described above.

FIG. 11 shows a representation of a plot of the logarithm of the energy or variance of an image subjected to a discrete cosine transform and shows how the energy is concentrated in one corner of the transform array, this being the corner corresponding to the lower frequency components. The coefficient selection process provided in accordance with the present invention would involve the selection of values corresponding to the lower values of i and j which would result in the small amount of energy contained in the higher frequency components being discarded. FIG. 11 illustrates particularly clearly that little information is lost by discarding the higher frequency components.

As described above with reference to FIGS. 5, 6 and 7, the transmission of the picture information takes place block by block and in each block the display of the picture is effected line by line along with the already displayed alphanumeric/graphical information on the page, and this means that the customer must wait for a short while, for example, 20 seconds between the depression of the hash key and the complete display of the picture or the page. If the customer is searching for a particular page, he may find that this 20 seconds delay in producing the picture is irksome and to overcome this it would be possible for the picture information to be transmitted in a different way so that the image is produced firstly as a vague image of very low resolution and the resolution is then progressively improved until it reaches its maximum value when all of the picture information has been transmitted. This is possible by modifying the order of transmission of transform coefficients since these coefficients contain particular frequency components of the picture being transmitted. The modification required is one which has the result that, instead of each block of transform coefficients being transmitted, the coefficients containing the lowest frequency components of all the blocks are transmitted first and then the coefficients containing the next lowest components follow and so on progressively until finally the coefficients containing the highest frequencies are transmitted.

What we claim is:

1. A method of transmitting an image, comprising: producing an array of samples representing picture elements of an original image; subjecting the samples to at least the lower sequency part of a two-dimensional unitary transformation matched to the size of the sample array, the higher sequency coefficients of the transformed sample array being omitted or not calculated so that an array of selected transform coefficients is produced, the array of selected transform coefficient being smaller than the original sample array; transmitting the selected transform coefficients; subjecting the transmitted coefficients upon reception, to a second, inverse, transformation to produce a second array of samples, and regenerating an image from the second array of samples, characterised in that the inverse transformation is matched to the size of the array of selected transform coefficients, whereby the second array of samples is smaller than the first array and the regenerated image has fewer picture elements than the original image.

2. A method according to claim 1 characterised in that the first-mentioned transformation is truncated so that only the second plurality of transform coefficients is produced.

3. A method according to claim 1 characterised in that each of the first-mentioned and its inverse transformation is formed by two orthogonal one-dimensional transforms multiplied together.

4. A method according to claim 3 characterised in that the one-dimensional transformations are Hadamard transformations.

5. A method according to claim 3 characterised in that the one-dimensional transformations are discrete cosine transformations.

6. A method according to claim 1 characterised in that the reproduced image has a fraction of the number of picture elements in each row and column of the original image.

7. A method according to claim 6 characterised in that the reproduced image has $\frac{1}{2}^N$ (N integral) of the number of picture elements in each row and column of the original image.

8. A method according to claim 1 characterised in that the original image is subdivided into a plurality of blocks and the image data in the blocks are transformed, transmitted and inversely transformed separately.

9. A method according to claim 1 characterised in that the transform coefficients are normalised to retain the energy invariance property of the transformations.

10. A method according to claim 1 characterised in that the transformation and inverse transformation are performed digitally.

11. A method according to claim 1 characterised in that the set of transform coefficients is stored prior to transmission.

12. A method according to claim 11 characterised by being performed in conjunction with a viewdata system, so that a small image is reproduced in a page of alphanumeric data.

13. Apparatus for transmitting an image, comprising source means, for producing a first array of samples representing an original image, first processing means responsive to the first array of samples to produce a set of output signals representing an array of transform coefficients, the coefficients being produced by a two-dimensional unitary transformation matched to the size of said first array of samples, the higher sequency coefficients of the transformed sample array being omitted or not calculated so that an array of selected transform coefficients is produced, the array of selected transform coefficients being smaller than the original sample array, a channel for transmitting the set of output signals from the first processing means, second processing means responsive to the transmitted output signals to subject the array of transform coefficients to a second, inverse transformation, to produce a second array of samples, and a display device for producing an image from the second array of samples, characterised in that the inverse transformation is matched to the size of the array of selected transform coefficients, whereby the second array of samples is smaller than the first array and the regenerated image has fewer picture elements than the original image.

14. Apparatus according to claim 13, characterised in that the first processing means is arranged to truncate the two-dimensional unitary transformation so that only the transform coefficients belonging to the set are produced.

15. Apparatus according to claim 13 characterised in that the first processing means is arranged to produce the transform coefficients resulting from the two-dimensional unitary transformation and then to select the coefficients belonging to the set.

16. Apparatus according to claim 13 characterised in that the first processing means is arranged to apply the two-dimensional unitary transformation to blocks of the original image separately and the second processing means is arranged to apply the inverse transformation separately to groups of transform coefficients derived from the blocks of the original image to produce corresponding blocks of the output image.

17. Apparatus according to claim 13 characterised in that each of the two-dimensional unitary transformation and its inverse is performed as two one-dimensional transformations in succession applied respectively to the rows and columns of the image or its transform.

18. Apparatus according to claim 17 characterised in that the one-dimensional transformations are Hadamard transformations.

19. Appparatus according to claim 17 characterised in that the one-dimensional transformations are discrete cosine transformations.

20. Apparatus according to claim 13 characterised in that the first processing means is arranged to normalise the transform coefficients so as to retain the energy invariance property of the transformations.

21. Apparatus according to claim 13 characterised by means for storing the set of transform coefficients prior to transmission through the channel.

22. Apparatus according to claim 13 characterised by analogue to digital conversion means for converting the samples of the original video signals into digital form, and digital to analogue conversion means for producing an analogue output video signal from the second plurality of samples generated by the second processing means, the first and second processing means and the transmitting channel handling digital signals.

23. Apparatus according to claim 13 characterised by being incorporated in viewdata apparatus thereby enabling a picture to be included in a page of alphanumeric data.

* * * * *

UNITED STATES PATENT AND TRADEMARK OFFICE
CERTIFICATE OF CORRECTION

PATENT NO. : 4,504,860
DATED : Mar. 12, 1985
INVENTOR(S) : Richard C. Nicol et al It is certified that error appears in the above-identified patent and that said Letters Patent are hereby corrected as shown below:

In the Title at data line [54] and at Column 1, line 1,

"PROCESS" should read --APPARATUS--

Signed and Sealed this

Ninth Day of July 1985

[SEAL]

Attest:

DONALD J. QUIGG

Attesting Officer     Acting Commissioner of Patents and Trademarks